April 27, 1965   B. F. KUPFERT ETAL   3,180,648
SEALS
Filed Dec. 14, 1959   4 Sheets-Sheet 1
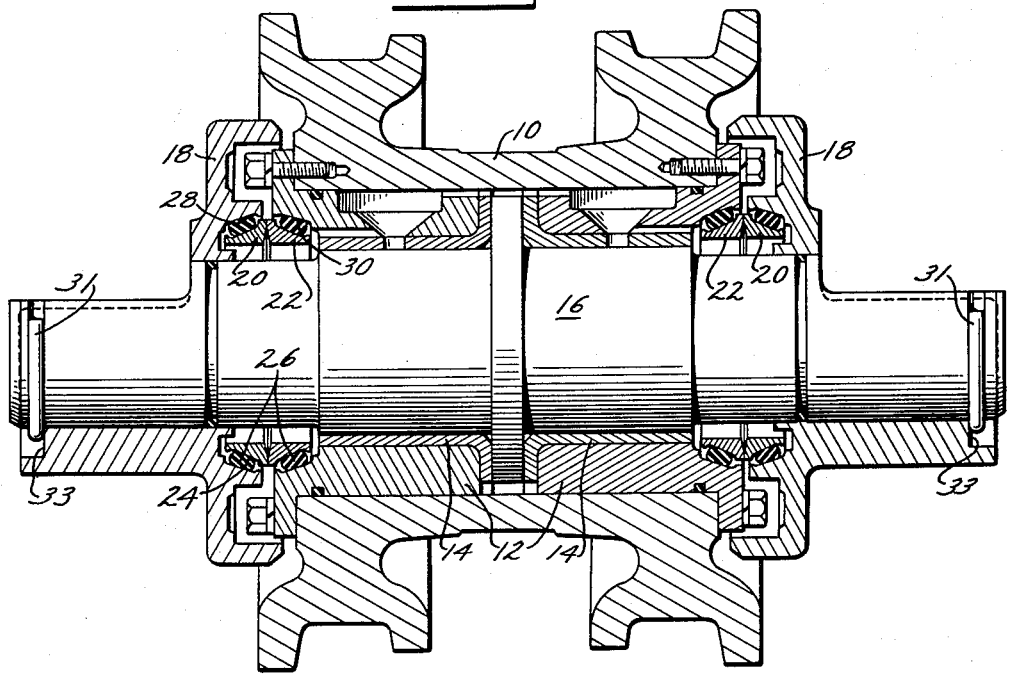
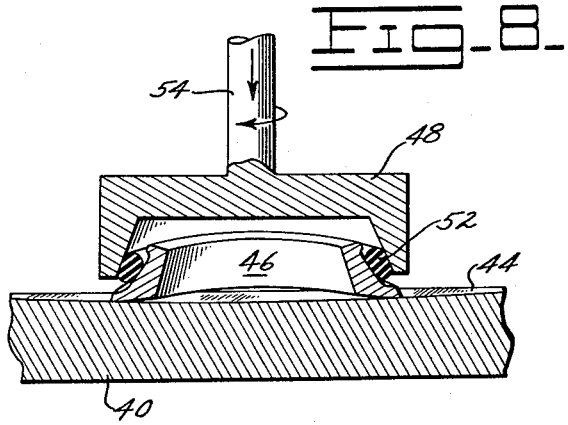
INVENTORS
BERNARD F. KUPFERT
RALPH W. YOCUM
BY
*Fryer and Johnson*
ATTORNEYS

INVENTORS
BERNARD F. KUPFERT
RALPH W. YOCUM
BY
ATTORNEYS

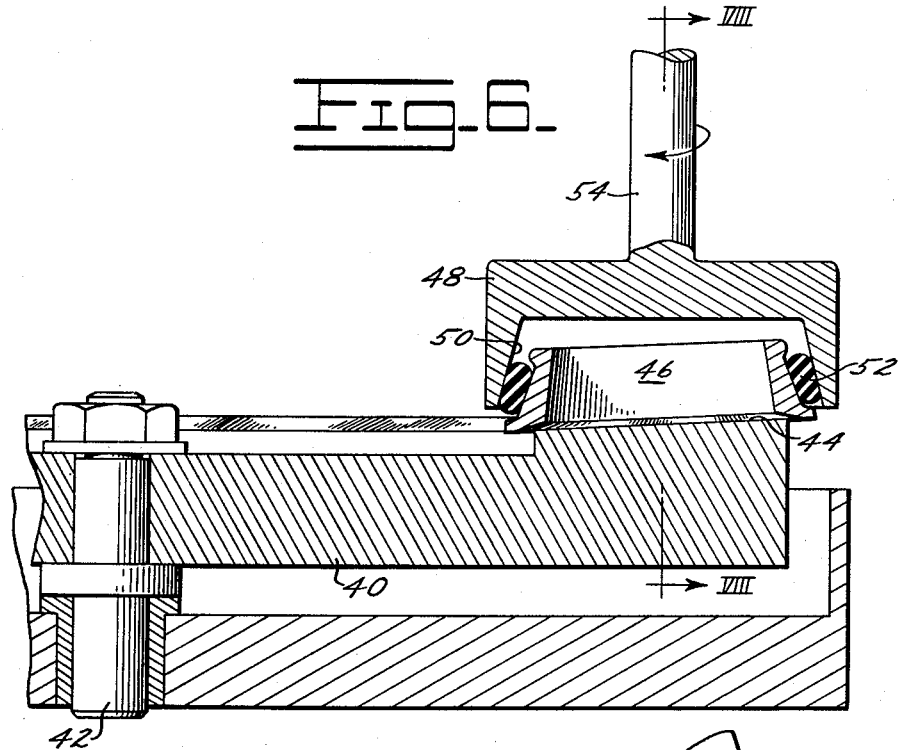
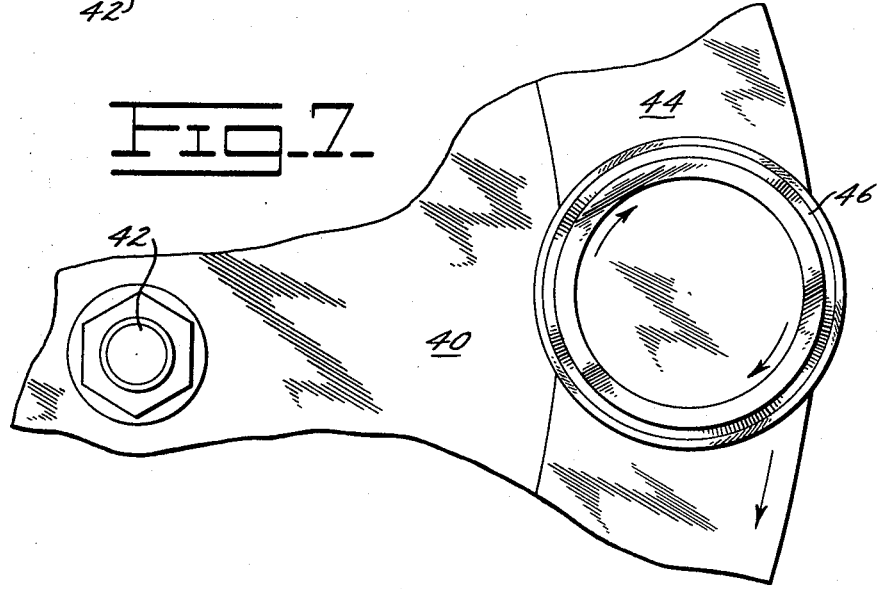

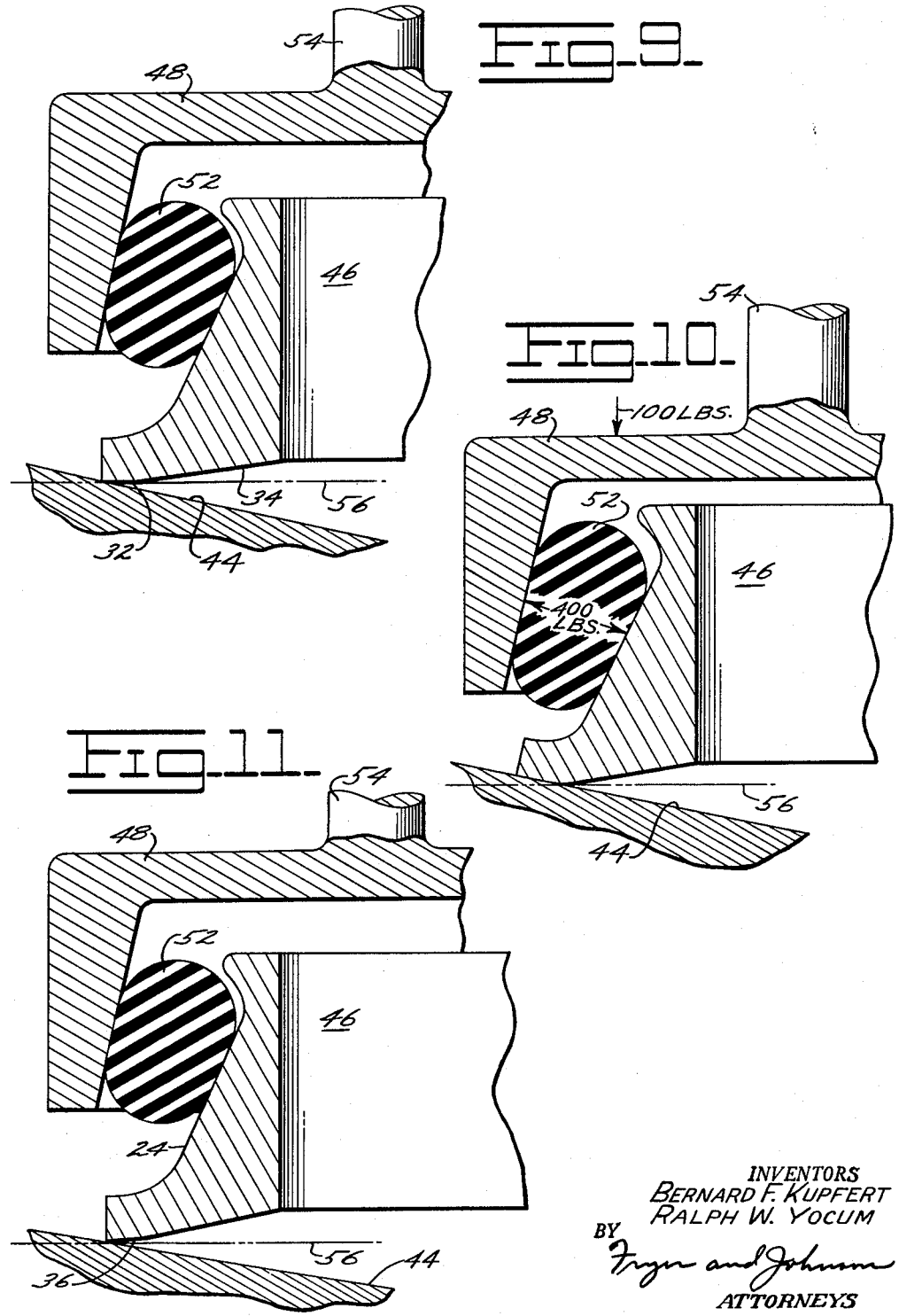

United States Patent Office 3,180,648
Patented Apr. 27, 1965

3,180,648
SEALS
Bernard F. Kupfert and Ralph W. Yocum, Peoria, Ill., assignors to Caterpillar Tractor Co., Peoria, Ill., a corporation of California
Filed Dec. 14, 1959, Ser. No. 859,166
6 Claims. (Cl. 277—92)

This invention relates to seals of the kind employed for retaining lubricant in and excluding foreign matter from the vicinity of bearing surfaces between relatively moving parts and particularly to face-type seals wherein sealing is accomplished by mating surfaces of relatively rotating seal parts of hard material.

In seals which employ two rings of metal or other hard material relatively rotating in face-to-face contact the production of perfect sealing surfaces and particularly of surfaces which will endure and maintain a seal throughout many hours of severe service has heretofore not been accomplished.

The present invention is described and illustrated herein in its application to the track roller of a track-type tractor which is notably subject to operation in environments which are highly destructive to seals. It is well known, for example, that the failure of track roller seals causes failure and destruction of the other components of the roller long before the expiration of its intended service life. Inadequacy of the seals has led to the practice of frequent and abundant lubrication of the roller. Since lubricant is introduced under pressure, its use has been responsible for rupturing the bellows-type protective members often employed with seal rings or for actually forcing abrasive substances or other foreign matter between sealing surfaces. In this manner, lubricant escapes and foreign matter is permitted to enter the bearing compartments of the rollers to effect their destruction.

Many seals of the prior art have employed flat lapped surfaces in face-to-face contact and of considerable area. In other words, wide annular sealing bands between relatively rotating parts have been erroneously considered superior to narrow bands. It has been discovered, however, that wide bands produce excessive fretting and galling due to the difference in relative surface speeds between their inner and outer margins and, therefore, tend to destroy themselves in service.

Prior to the advent of the present invention, it has been generally accepted knowledge in the tractor industry that track roller life in large tractors was limited to a few hundred hours because of seal failure and inadequate lubrication resulting therefrom. The industry has striven toward production of seals that would perform consistently for 500 hours without replacement. In contrast, the present invention provides a seal having components of extremely high precision capable of being economically manufactured by mass production methods. The seals have performed prefectly for periods as long as 5000 hours with no appreciable wear to the contacting faces. Thus the seal of the present invention may be expected to endure and function satisfactorily for a much greater length of time than the other components of the track roller and will in many cases serve beyond the anticipated useful life of the tractor itself.

While the seal of the present invention is described in connection with tractors where it has proven its superiority in service on track rollers, carrier rollers and final drive mechanisms, all subject to extremely severe service conditions, it is by no means limited to such service but is applicable to many uses where a perfect fluid seal between relatively rotating parts is desired.

The size of seal rings usually has practical limitations arising from the space in which they are to be used and the cost of material of which they are formed. Since considerable pressure is necessary to maintain the mating surfaces of the rings in sealing contact under operating conditions, the rings are also subject to distortion in use. Consequently rings with perfectly flat or otherwise complementary mating surfaces are so distorted in use that only marginal edges of their annular sealing bands are in contact. This causes rapid wear and since the contacting areas are extremely narrow, leakage occurs upon very slight misalignment of rings from their intended concentric positions.

The present invention is predicated partially on the discovery that while it is undesirable for the annular sealing faces of two rings to have only distinct marginal contact, it is desirable that they are not manufactured with perfect flat face-to-face contact. The most desirable configuration of the contacting surfaces, and especially during their initial service or wearing-in period, is an extremely slight variation from perfect mating. It is also desirable, for reasons to be set forth in the following specification, that the variation from flat or perfectly mating surfaces be such as to cause positive contact under pressure at the inner rather than the outer margin of the annular sealing areas.

It is, therefore, among the objects of the present invention to provide ring-type face-to-face seal members which correct or compensate the deformity caused by pressure applied to said members in service as well as deformity caused by temperature due to friction.

A further object is to provide seal rings which insure that annular contacting or sealing areas of two such rings, when brought into face-to-face relationship under pressure, will occur at the inner rather than the outer marginal edges of their finished annular sealing bands.

A still further object of the invention is to provide an annular sealing surface on a seal ring which compensates for the deflection of the ring under service conditions and to do so in a manner which enables the production of a highly polished surface having an extremely high degree of precision.

Further and more specific objects and advantages of the present invention and the manner in which it is carried into practice are made apparent in the following specification wherein the invention is described in detail by reference to the accompanying drawings.

In the drawings:

FIG. 1 is a central section taken through the track roller of a track-type tractor illustrating seals constructed in accordance with the present invention as they are assembled therein;

FIG. 6 is a fragmentary sectional view of a portion of a lapping tool employed in making the rings of the present invention;

FIG. 7 is a fragmentary view in plan of a portion of the tool illustrated in FIG. 6 and illustrating the position of a ring being lapped thereon;

FIG. 8 is a sectional view taken on the line VIII—VIII of FIG. 6; and

FIGS. 9, 10 and 11 are enlarged exaggerated fragmentary views illustrating the effect produced by lapping in accordance with the present invention on the lapping tool shown in FIGS. 6, 7 and 8.

Figure 3:
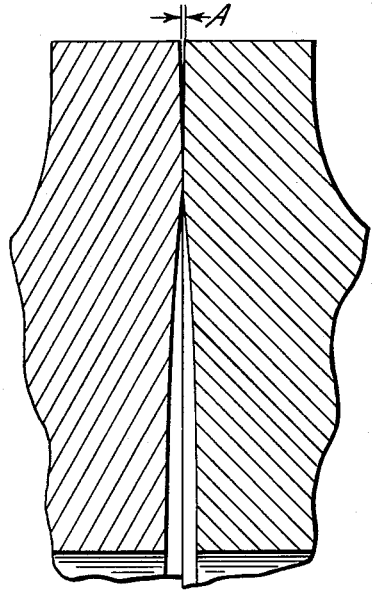
FIG. 3 is a view similar to FIG. 2 illustrating the same rings as they appear after the application of pressure applied in service.

The track roller illustrated in FIG. 1 comprises a conventional roller element 10 mounted on hub members 12 which carry bearing bushings 14 all rotatable upon a roller shaft 16. In use, the roller shaft is mounted between the truck frames of a crawler-type tractor through conventional means (not shown). End plates or collars 18 are mounted against rotation on the shaft and each end plate provides a support for a stationary seal ring 20 arranged coaxially and in face-to-face contact with a rotatable seal ring 22 supported by and for rotation with each of the hub members 12.

Figure 4:
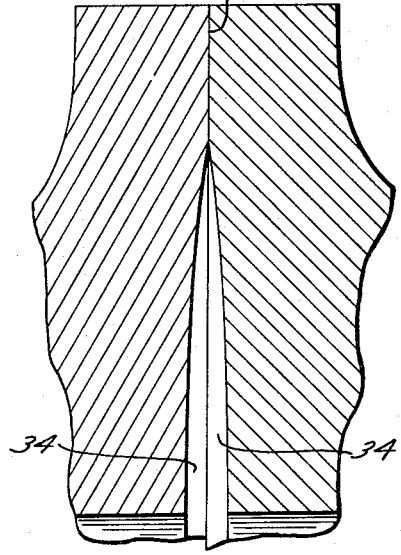
FIG. 4 is a similar view illustrating the appearance of a pair of flat lapped seal rings brought together without pressure.

Each of the seal rings 20 and 22 is in the form of an annulus which, as is best seen in enlargement in FIG. 11 comprises an inclined outer surface area 24 extending to a generally radially projecting distortable flange. Each ring is supported by a torus of elastic material shown at 26 compressed between its inclined surface 24 and an opposed inclined surface. The opposed inclined surfaces for the stationary rings 20 are formed on the end caps 18 as shown at 28 in FIG. 1. For the rotatable rings 22 the opposed surfaces are formed as at 30 in the ends of the hub members 12. The angles of inclination of the surfaces 24, 28 and 30 between which the tori 26 are compressed are such that upon inward movement of the caps 18 with respect to the shaft, the tori act in the manner of springs to bring the seal rings 20 and 22 into face-to-face contact under pressure with a spring rate that is fairly constant during a large increment of movement. In other words, because of gradual convergence of the inclined surfaces 24 and 28, the rate of compressibility of one of these tori which may be compared to the rate of a spring is effectively changed from its normal high rate to a very low rate over a wide range of movement of the assembled parts. It is simply necessary, therefore, during assembly, to move the end collars 18 inwardly to a predetermined fixed position to obtain substantially uniform pressure at the contacting faces of the seal rings. In the present design, this is accomplished by snap rings 31 fitting grooves adjacent the ends of the shaft 16 and engaging shoulders 33 formed in extensions of the end collars. These extensions and the ends of the shaft 16 are flat on their upper sides to facilitate their connection to the flat lower surface of a tractor track frame. The abutting faces of a pair of seal rings, greatly enlarged, is illustrated in FIG. 4 as having conventionally lapped external marginal sealing bands which have been formed flat and are in face-to-face contact as represented by the contacting surfaces 32. A tapered relieved area 34 on each ring extends from the sealing area inwardly to the inner margins of the rings. It has proven in practice that when two rings of this configuration when properly dimensioned are rotated under pressure, and in face-to-face contact, that upon wear of the sealing surfaces at 32 the band of contact progresses inwardly becoming destroyed at its outer edge and progressively reforming itself in the area of the tapered relieved portion 34 until it reaches the inner margin of the sealing rings and overlaps that margin at which time the rings lose their effectiveness and must be replaced.

The foregoing is an expression of the manner in which, theoretically, the rings illustrated in FIG. 4 have been expected to function but in practice it is necessary to apply pressure to the rings in an axial direction in order to prevent loss of lubricant or entry of abrasive material and a pressure of 100 pounds or more is applied in the application of seals such as shown in FIG. 1. The application of pressure through the ring supporting mechanism herein illustrated causes distortion of the rings. This results from the fact that axial movement of the inclined surfaces 28 and 30 inwardly with respect to each other or toward the seal faces effects compression of the elastic tori between these surfaces and the inclines 24 on the rings. A typical example may be taken from rings in actual service in the environment shown in FIG. 1 where a pressure of approximately 100 pounds in an axial direction is obtained. Referring to FIG. 10 this pressure represented in direction by an arrow produces a compressive force on the torus substantially normal to the inclined surfaces of about 400 pounds. The transmission of this force to the ring causes a rearward deflection of its outer marginal edge and sealing band. The resulting condition is represented in FIG. 5 where the sealing surfaces 32 are shown as spread apart save for a narrow line contact at their inner margins shown at 35.

Most seals thus constructed fail rapidly and some almost immediately upon being placed in service because the slightest eccentricity which may be present permits leakage of lubricant as well as entry of foreign material between the surfaces 32 before they have had an opportunity to wear or lap each other to a flat condition in use.

The distortion of the seal rings described above is not readily overcome by conventional methods. The use of springs or other resilient means directly behind the rings also causes distortion unless excessively heavy rings are used and requires flexible or bellows-type guards around the rings which are undesirable. Furthermore, the use of elastic tori between angularly related surfaces as herein disclosed has proven most satisfactory from the point of simplicity and the ability to properly support the rings and provide a leak proof joint and positive driving connection for them.

Figure 2:
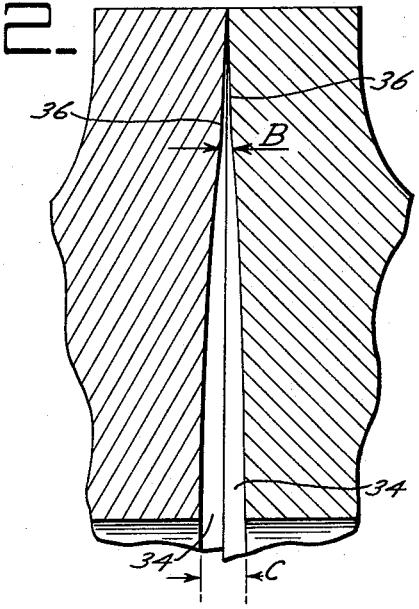
FIG. 2 is a greatly enlarged fragmentary sectional view of the mating faces of a pair of seal rings such as shown in FIG. 1 brought together in face-to-face relationship without pressure.
Figure 5:
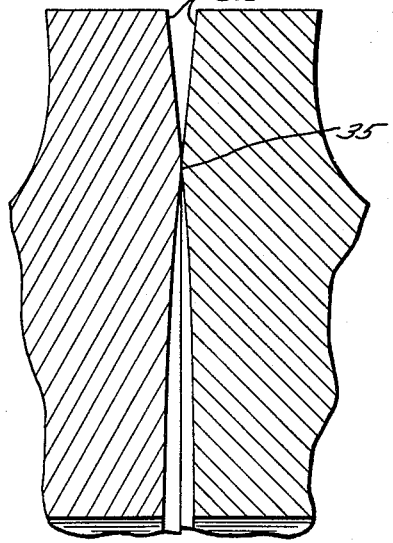
FIG. 5 is a similar view illustrating the undesirable positions assumed by the rings of FIG. 4 after the application of pressure thereto.

The seal faces of the present invention are formed to overcome the aforemention difficulties in the manner illustrated in FIG. 2 wherein the marginal sealing bands shown at 36 which correspond to the bands 32 in FIGS. 4 and 5 are formed as a frustum of shallow internal conical or substantially cone-shaped concave surface, the apex of which would occur at the center of the seal ring. Thus when two rings are brought together without pressure in the manner of FIG. 2, they contact only at the outer marginal edges of the sealing bands 36. When pressure is applied, the rings assume the positions illustrated in FIG. 3 where the sealing bands are in substantially flat face-to-face contact but preferably spaced at their outer margins as shown a distance "A" in FIG. 3 which is in the order of 50 millionths of an inch. Thus, a perfect seal is accomplished toward the inner margins of the sealing areas and the outer margins are sufficiently close to prevent the entry of foreign material. Construction of the sealing bands is such that an effective fluid tight seal is produced immediately upon installation of the seal rings in track rollers and no wear-in period is required.

In order to form seal rings having the configuration which is shown in exaggeration in FIGS. 2 and 3 and capable of operation in the manner described in connection therewith, an example will be given of a ring with an overall outside diameter of approximately 3¼ inches in which the entire face made up by the seal band and the adjacent relieved area is approximately ⅜ inch wide and the seal band represented at 36 in FIG. 2 is approximately ¹⁄₁₀ inch in width. The invention, of course, is in no way limited by these dimensions which are only to be taken as typical. The rings are cast of suitable hard material with their abuttable surfaces flat, or substantially flat, one suitable material for this purpose being Stellite though other metal or non-metallic material may be employed. They are then rough lapped with their abuttable faces against a large rotating lapping table which has a spherical contour on a radius of about 80 inches to form the relieved areas 34 for seal band reforming as described above in relation to FIG. 4. This is followed by a fine lap, after thorough cleansing of the rings to remove the particles of rough lap compound and metal therefrom, to produce a surface substantially free of scratches. The rings are then preferably, but not necessarily, subjected to a flat lap with a compound of the same grade as the second lap to roughly form the flat sealing band as it is illustrated at 32 in FIG. 4. This band is then finished to the slightly conical configuration illustrated at 36 in FIG. 2 by first again thoroughly cleansing the ring and then lapping it for a brief period of time with the apparatus shown in FIGS. 6, 7 and 8. This apparatus comprises a circular table partially shown at 40 freely rotatable as on a spindle 42 and having a raised annular lapping surface 44. The surface 44 is a concave lap surface illustrated in exaggeration as a frustum of an internal cone but so shallow that its outer margin is only approximately .005 inch higher than its inner margin. The ring to be lapped, illustrated at 46 in FIGS. 6, 7 and 8, is held in a chuck or adapter 48, the inner periphery of which is inclined as at 50 to correspond to the incline 28 or 30 of FIG. 1 which supports the torus and the ring in service. A torus 52 identical to the torus used in service is employed. The ring is then rotated against the lapping surface 44 and under pressure comparable to and preferably substantially the same as the pressure to which it is subjected in service. The rotary motion and pressure may be applied by any suitable mechanism such for example as a drill press which support the adapter 48 through a stem 54 thereof. The width of the annular frusto-conical lapping surface 44 is slightly less than that of the ring to provide for escape over its edges of spent lapping compound and removed material through all surfaces of the sealing band come in contact with the lapping surface as is illustrated in the section shown in FIG. 8. Since the rotary motion of the ring imparts rotary motion to the table through friction the surface of the table is automatically dressed as it is used.

The effect of this final lapping operation is illustrated in great exaggeration in FIGS. 9, 10 and 11. FIG. 9 illustrates the position of the parts when the ring having a flat seal band area such as illustrated at 32 in FIG. 4 is brought into contact with the conical lapping surface 44. FIG. 10 illustrates the distortion of the ring under pressure comparable to the pressure to which it is subjected in use and the manner in which its flat lapping area is urged away from the flat plane indicated by the broken line 56. Having been lapped in this distorted position and the pressure relieved, the ring will assume the position illustrated in FIG. 11 where the inwardly tapered conical seal band 36, also illustrated in FIG. 2, is shown to have been formed. Thus, an internal conical surface is lapped against an internal conical lapping surface by deforming the surface to be lapped during lapping. Furthermore the extent of deformation can be critically controlled by varying the deforming pressure and extremely close tolerances can be held in the configuration and dimensions of the finished product. Even the slight deformations due to heat of friction may be compensated. Since it is known that the temperature of the rings during the final lapping process is greater than in service where they are cooled by lubricant, slight variations in lapping pressure or in the conical surface 44 of the lapping table serve to produce a seal band with a perfect seal at its inner margin as shown in FIG. 3.

It would be possible to form such an internal conical seal band on an external conical lap surface but this would be impractical and highly undesirable because of the fact that lapping would always take place in the same area of such a surface so that it would require frequent dressing or reforming and would be unsatisfactory for mass production of identical parts. In fact each part so lapped would vary slightly from the next because of the wear of the lapped surface whereas the production of rings under the method of the present invention makes them so identical that they may be mated at random from stock.

Another advantage which results from the formation of a conical lapped surface by distorting under pressure against an oppositely inclined conical lapping surface is that considerable pressure is required to produce an extremely fine lapped or polished surface such as required for forming a perfect seal.

Using as an example again the seal ring for a track roller with an overall diameter of about 3¼ inches the gap at the inner margin of the seal band between two facing rings under no load as at "B" in FIG. 2 is about 80 millionths of an inch and the gap "C" at the inner margins of the relieved areas 34 is about 16 thousandths of an inch. These dimensions will, however, vary materially for rings of different sizes and with rings of different materials which may vary in hardness and other characteristics.

We claim:

1. In a seal utilizing loading means for applying a selected load to bring seal faces of relatively rotatable parts in operative fluid-tight sealing engagement, a seal ring having a generally radially extending distortable flange which is elastically distorted under the load applied when the ring is operatively associated with the mating part, the mating face of the flange in the unloaded condition having annular seal band means concavely curved, the curvature of said seal band means enabling the same (1) to produce, under said selected load applied in a direction axially of the ring which elastically distorts said flange, an annular area of substantial width of fluid sealing contact with the mating part at the inner marginal portion of said seal band means; and (2) to bias the seal band means towards separation at its outer periphery from the mating part, under the elastic distortion produced by said selected load.

2. A seal comprising a pair of mating seal rings and loading means for applying a load to the rings in an axial direction to engage the rings in rotary fluid sealing contact, each of said seal rings having a generally axially extending portion engaged by the loading means, a generally radially extending distortable flange at the end of the axial portion adjacent the mating ring, the mating face of each flange, under no load, having annular seal band means formed as a frustum of a conoidal surface with a cone angle just sufficient to bias the seal band means toward separation at their outer edges and to cause the seal band means to meet in substantially flat face-to-face fluid sealing planar contact radially inwardly of the outer edges of the flanges under the load applied by the loading means.

3. The combination of a seal ring and loading means for applying a load to the ring for engaging the ring with a relatively rotatable mating part, said seal ring having a generally axially extending portion, a relatively thin and generally radially extending distortable flange on the end of the axial portion adjacent the mating part, a precisely lapped annular seal band formed on the side of the flange facing the mating part and presenting a concave surface having a curvature to bias the seal band, under the initially applied flange distorting operating pressure produced by the loading means, toward separation at its outer periphery from the relatively rotatable mating part and to cause the seal band to be in substantially flat face-to-face fluid sealing rotatable contact with a radially extending planar surface of the relatively rotatable mating part inwardly of said outer periphery.

4. A seal ring as defined in claim 3, wherein said separation is of the order of magnitude of 25 millionths of an inch.

5. In combination in a seal of the kind in which a seal ring is rotatably associated under load with a mating part to form a fluid-tight seal across engaged relatively rotatable surfaces of the ring and mating part, said seal ring having a generally axially extending portion which includes an inclined outer surface increasing in diameter near the end engaged with the mating part, a generally radially extending distortable flange on the axial portion at the large diameter end thereof, an annular seal band formed on the side of the flange facing the mating part, said seal band being inclined inwardly with respect to a radial plane in the unloaded condition of the seal ring, and means engaged with the inclined outer surface for suspending the seal ring in position against the mating part and applying a uniformly distributed selected load on the inclined outer surface to distort the flange and position an annular area of substantial width of the seal band in fluid sealing engagement with the mating part in the initial assembled condition of the seal, the inward inclination of the seal band in the unloaded condition being related to the distortion of the flange under the selected uniform load in initial operation to locate said annular area near the inner diameter of the seal band.

6. A seal ring of the kind rotatably associated under a selected load with a mating part to form a fluid-tight seal in a radial plane across engaged relatively rotatable surfaces of the ring and mating part in the radial plane, said seal ring having a generally axially extending portion, a relatively thin and generally radially extending distortable flange at one end of the axial portion, an inclined outer surface on the axial portion increasing in diameter near the flange and engageable by a compressible torus which applies the selected load to distort the flange, an annular seal band formed on the side of the flange engageable with the mating part, said seal band being concavely curved from the radial plane when no load is applied to the ring with a curvature related to the distortion of the flange when the ring is loaded by the torus in initial operation to bias the seal band toward separation at its outer periphery from the radial plane and to cause said seal band to be in substantially flat face-to-face fluid sealing engagement in the radial plane with the mating part radially inwardly of the outer periphery, and a tapered relieved area distinct from the seal band and extending from the inner diameter of the seal band to the inner margin of the ring for progressive reforming of the seal radially inwardly of the seal band during continued operation of the ring.

References Cited by the Examiner
UNITED STATES PATENTS

| | | | |
|---|---|---|---|
| 254,736 | 3/82 | Van Tine | 277—124 |
| 1,204,063 | 11/16 | Pratt | 277—96 XR |
| 2,189,685 | 2/40 | Stevenson | 286—11.13 |
| 2,574,793 | 11/51 | Maracz | 51—290 |
| 2,577,818 | 12/51 | Shaw | 51—290 |
| 2,590,759 | 3/52 | Dale | 277—92 |
| 2,801,117 | 7/57 | Bourgeois et al. | 277—96 XR |
| 2,853,323 | 9/58 | Engelking et al. | 286—11.14 |
| 2,858,149 | 10/58 | Laser | 277—96 XR |
| 2,908,521 | 10/59 | Kangas | 277—92 |
| 2,917,330 | 12/59 | Vanta | 286—11.13 |

LEWIS J. LENNY, *Primary Examiner.*
CORNELIUS D. ANGEL, MORRIS M. FRITZ, WALTER A. SCHEEL, EDWARD V. BENHAM,
*Examiners.*